United States Patent Office  3,116,259
Patented Dec. 31, 1963

3,116,259
METHOD OF PREPARING ISOMERIZATION CATALYST
Marcellus J. Geerts, Evanston, and Charles T. O'Malley, Crystal Lake, Ill., assignors to The Pure Oil Company, Chicago, Ill., a corporation of Ohio
No Drawing. Filed Mar. 30, 1960, Ser. No. 18,509
10 Claims. (Cl. 252—439)

This invention relates to new and useful improvements in processes for the isomerization of low-molecular-weight normal paraffin hydrocarbons, such as n-pentane and n-hexane, and more particularly, to an improved isomerization catalyst and method of preparing the same.

It has been found that the isomerization of n-hexane and n-pentane can be efficiently carried out by passing those hydrocarbons in admixture with hydrogen over a catalyst under moderate-temperature, isomerization conditions. When hexane or pentane is isomerized in this manner, a mixture of hydrogen and the hydrocarbon in a hydrogen/hydrocarbon mol ratio in the range from about 0.5 to 5.0 (preferably about 2.0 to 3.5) is passed over a composite refractory catalyst (prepared and activated in accordance with this invention) at a pressure within the range of about 100–1000 p.s.i.g. (preferably about 500–650 p.s.i.g.) and a temperature within the range of about 650–8° F. (preferably 700°–790° F.). The most effective composite catalyst for the isomerization of normal paraffin hydrocarbons under these conditions consists of an acidic silica-alumina support (containing 70–90% silica) having deposited thereon about 0.01–1.0% wt. of palladium. In accordance with this invention, it has been found that the treatment of the silica-alumina support with a substance selected from the group consisting of elemental sulfur, sulfur-yielding compounds (i.e., compounds other than metallic salts of sulfur which decompose to yield elemental sulfur), and compounds containing sulfur reactable with the hydroxyl groups in the silica-alumina, at a temperature of 400°–1000° F. until reaction with hydroxyl groups in the silica-alumina is complete, produces an isomerization catalyst having high isomerization activity and resistance to poisoning resulting from trace amounts of sulfur in the hydrocarbon feed.

It is therefore an object of this invention to provide an improved process for the preparation of a highly active isomerization catalyst which is resistant to decline in activity resulting from sulfur in the hydrocarbon feed.

Another object of this invention is to provide an improved isomerization catalyst capable of effecting the isomerization of n-pentane and n-hexane to isoparaffins in high yield and which is resistant to sulfur-aging.

A further object of this invention is to provide an improved process for the isomerization of n-hexane and n-pentane using a catalyst having high initial activity and resistance to aging resulting from the presence of small amounts of sulfur in the hydrocarbon feed.

A feature of this invention is the provision of a process for the preparation of a highly active isomerization catalyst in which a silica-alumina support is treated with a substance selected from the group consisting of elemental sulfur, sulfur-yielding compounds, and compounds containing sulfur reactable with the hydroxyl groups in the silica-alumina, at a temperature in the range from about 400°–1000° F. until reaction with the hydroxyl groups in the silica-alumina is complete, followed by impregnation of the treated silica-alumina carrier with a solution of a reducible palladium compound (preferably containing 1–5% wt. of a reactive fluorine-containing compound, such as hydrofluoric acid, or trifluoroacetic acid), and reduction of the impregnated catalyst with hydrogen at an elevated temperature to produce a highly active catalyst.

Another feature of this invention is the provision of a new and improved catalyst composition prepared in accordance with the process of this invention.

Still another feature of this inveniton is the provision of an improved process for the isomerization of n-pentane and n-hexane in which either or both of said hydrocarbons are passed with hydrogen at an elevated pressure and a temperature, in the range of about 650°–800° F., over a catalyst consisting of 0.01–1.0% wt. palladium on silica-alumina, containing 50–95% silica, which silica-alumina has been treated with a substance selected from the group consisting of elemental sulfur, sulfur-yielding compounds, and compounds containing sulfur reactable with the hydroxyl groups in the silica-alumina, at a temperature of about 400°–1000° F. until reaction with the hydroxyl groups in the silica-alumina is complete.

Other objects and features of this invention will become apparent from time to time throughout the specification and claims as hereinafter related.

Metal oxides, including mixtures of metal oxides, are well known as catalysts and as supports in catalyst compositions containing various metals of groups V, VI, VII, and VIII of the periodic table. For example, silica-alumina is well known as a hydrocarbon cracking catalyst, and as a support for metals, such as nickel, platinum, palladium, etc., for use in the hydrogenation, reforming, isomerization, etc., of hydrocarbons and mixtures thereof. Similarly, alumina and silica-alumina combinations are known as supports for cobalt and/or molybdenum, etc., for use in reforming or dehydrogenating hydrocarbon mixtures. Many of these prior art catalyst compositions undergo gradual loss of activity during prolonged use at elevated temperatures, probably because of a gradual degradation of the support structure, as by loss of structural water, or of the surface hydroxyl groups as water. Furthermore, many of these catalyst compositions undergo an activity decline caused by the irreversible reaction of one or more of the catalyst constituents with sulfur compounds, by the deposition of sulfur-containing contaminants, or by the deposition of coke. In general, surface deposits consisting of sulfur-containing contaminants or coke can be burned from the catalyst, thereby revivifying it. However, activity loss caused by the chemical association of one or more of the constituents with sulfur, and/or by destruction of the support structure, usually cannot be regained and the catalyst eventually must be removed and replaced. Because of the deleterious effect on certain reactions of even trace amounts of sulfur on some of these catalysts, a guard-case usually is employed ahead of the reactor, and feed stocks are carefully selected and prepared to prevent contact between the catalyst and even traces of sulfur. This of course is costly and is to be avoided, if possible.

It is known that silica gel, which has the theoretical surface structure,

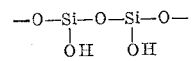

has a high surface area which is susceptible to modification or sintering at elevated temperatures. Alumina, silica-alumina, silica-zirconia, silica-magnesia, and other gel-derived solid oxide compositions are generally subject to similar deleterious effects.

We have found that these deleterious effects, particularly in isomerization catalysts consisting of palladium on silica-alumina, can be overcome by chemically reacting the surface hydroxyls (or other active surface sites) of the silica-alumina, at temperatures of about 400°–1000° F., with elemental sulfur, sulfur-yielding compounds, or compounds containing sulfur in a form reactable with the hydroxyl groups (or other active sites) in the silica-alumina. The silica-alumina which is thus treated is used as a support for a palladium-containing isomerization catalyst, and is improved in thermal stability and resistance to aging resulting from trace amounts of sulfur in a hydrocarbon feed.

In this invention, the primary emphasis and importance is placed upon the application of our process to improve the characteristics, particularly surface-area index and resistance to sulfur-aging, of palladium on silica-alumina catalysts. The improved catalyst compositions are prepared by reacting the hydroxyl groups (or other active sites) of the silica-alumina with elemental sulfur, or a sulfur compound which decomposes to yield sulfur, or which contains sulfur in a form reactable with the hydroxyl groups of the silica-alumina. The reaction with the surface hydroxyls, or other reactive sites, is conducted at elevated temperatures of the order of 400°–1000° F., preferably of 750°–975° F., at which temperature the reaction mass is maintained for a sufficient length of time to reach completion of reaction. Pressure does not appear to affect the process, but it is possible that it might be desirable in some instances to use superatmospheric pressures, where it is desired to carry out the reaction with sulfur or a sulfur compound in liquid phase, rather than gas phase. The success of this process depends upon the presence of a substantial number of reactive hydroxyl groups, or related groups, on or in the gel structure at the time the sulfur or sulfur compound is added. Consequently, it is essential that the gel has not been heated to a temperature prior to this treatment which is sufficient to destroy the reactive surface sites. Because the effectiveness of this method is inversely proportional to the temperature to which the gel has been previously subjected, and to the extent to which structural hydroxyl groups have been removed, maximum benefit is gained in treating silica-alumina gels which have not been heated sufficiently to eliminate hydroxyl groups. For example, it has been found that irreversible water begins to be driven off from silica-alumina gels at a temperature of 500° F. Consequently, it is preferred to treat silica-alumina gels before they have been heated to temperatures in excess of about 500° F. It is noted, however, that some improvement is gained even in the cases of gels which have been heated in the range from 500°–800° F.

In general, this process involves only the reaction of gel hydroxyl groups capable of reacting to form and eliminate water, or an acidic by-product, with the selected reactant material in accordance with the process which will be subsequently described. Consequently, the maximum amount of reactive substances added is just sufficient to react with all surface hydroxyl groups or active surface sites. However, it is probable that less than the maximum reactive amount of these reactants should be used in instances where the catalytic effectiveness of the composition is dependent upon the acidity of the support. Thus, in many cases, the amount to be added is only sufficient to gain the benefits of modification of surface area index of the gel without significantly diminishing the acidity of the gel. We have found that the various reactant materials may be used in amounts as small as about 1% of the reactive maximum (although 10–50% is preferred) to gain increased surface-area index and stabilization against sulfur poisoning.

In carrying out this invention, we have determined the maximum amount of the compound or other reactant material to be incorporated in the gel structure by ascertaining through experiments the amount of irreversible water lost by the gel when it is heated to the maximum temperature at which it is to be used or treated. Of course, the total amount of irreversible water removable from the gel can be determined by completely sintering it, but this is usually unnecessary and undesirable, since other non-destructive techniques are available. Then, having determined the amount of water at a given temperature, an amount of the reactant material from 1–100% of the stoichiometric equivalent of the number of hydroxyl groups required to form that amount of water is added.

When it is desired to determine the number of surface hydroxyls in a silica-alumina gel which can be treated in accordance with this invention, a quantity of the gel is placed in a suitable vessel and dried to constant weight at a first elevated temperature by passing a stream of dried, inert gas therethrough. Then the temperature is increased slowly to a higher fixed temperature while passing dry, inert gas through the bed, and when constant weight at the higher temperature has been reached, the sample is isolated and weighed. The sample is then rehydrated at the first temperature by contact with a humidified inert gas, whereupon the weight increases to an equilibrium value. The gel is then heated in a dry gas stream at said first temperature and weighed after equilibrium is reached. The sequence is repeated, heating the gel incrementally to higher temperatures during each repetition, until a "critical" temperature is eventually reached at which the gel does not regain its weight fully upon rehumidification and drying at the next lower temperature. Thereafter, the gel is heated to the highest temperature at which the final catalyst composition is to be used and/or treated, and is both rehydrated by contact with humidified inert gas and dehydrated by contact with dry inert gas at said "critical" temperature. The difference between the final weight and the initial weight at the "critical" temperature is the amount of irreversible water removed from the sample by heating it to the maximum temperature. From the quantity of irreversible water removed, it is simple to calculate the number of hydroxyl groups which produced this quantity of water and which are therefore available for reaction in accordance with this invention.

For obvious reasons, somewhat different procedures are required in reacting the silica-alumina gel with (1) elemental sulfur or solid, sulfur-containing reactants, (2) liquid sulfur-containing reactants, and (3) gaseous sulfur-containing reactants. These procedures are outlined as follows:

(1) *Elemental sulfur or solid sulfur-containing reactant.*—Elemental sulfur or solid sulfur-containing reactant is added to and thoroughly mixed with a silica-alumina gel at a sulfur concentration of about 0.05–3.0% wt. (preferably about 0.5–1.0% wt.), based on the weight of the gel. The maximum amount of sulfur or solid sulfur-containing reactant used is determined as described above by determining the amount of reactive hydroxyl groups in the gel. Then the physical mixture of silica-alumina and sulfur, or sulfur-containing reactant, is heated at 400°–1000° F., preferably 600°–800° F., for a time sufficient to complete the reaction of the sulfur or sulfur-containing compound with the gel. Generally, reaction periods of about 0.1–6.0 hours are required to complete the reaction, completion being evidenced by cessation of evolution of reaction by-products from the reaction chamber.

(2) *Liquid phase sulfur-containing reactant.*—A predetermined required amount of the liquid sulfur-containing reactant is dissolved in a volume of inert solvent which is just adequate to thoroughly wet the silica-alumina gel, and the gel is impregnated with said solution. Effective liquid sulfur-containing reactants include sulfur halides, such as $S_2Cl_2$ and $SCl_2$; carbon disulfide, sulfur oxytetrachloride ($SOCl_4$); thionyl chloride ($SOCl_2$); and thionyl perchloride ($CSCl_4$). The impregnated support is then dried and heated at a temperature of about 400°–1000° F., preferably 600°–800° F., for a time sufficient to complete the reaction of the sulfur-containing compound with the gel. Reaction periods of about 0.1–6.0 hours are required to complete the reaction, completion being evidenced by cessation of evolution of reaction by-products.

(3) *Gaseous sulfur-containing reactants.*—The silica-alumina gel to be treated is thoroughly dried at the temperature at which it is to be reacted with the gaseous sulfur-containing reactant, adequate drying being evidenced by a decrease in the water content of an effluent drying gas to less than 200 p.p.m. Then the sulfur-containing reactant gas, diluted to a concentration of about 10–95% vol., preferably about 60–85% vol., by adding hydrogen, is passed over the dried gel at a temperature within the range of 400°–1000° F., preferably 500°–750° F., for a time sufficient to attain complete reaction of the gel with the sulfur-containing compound. Reaction periods of about 0.1–5.0 hours are usually sufficient, completion of reaction being evidenced by the composition of the effluent treating gas becoming identical to the composition of the gas at the point of introduction. When the reaction has been completed, the treated support is cooled in contact with a slow flow of hydrogen. Suitable gaseous sulfur-containing reactants include hydrogen sulfide, carbonyl sulfide, etc.

After the silica-alumina catalyst supports have been treated with sulfur or a sulfur compound in accordance with this invention, palladium is added in any suitable manner, such as by precipitation of an insoluble salt from a solution of a soluble salt, followed by calcination and activation by reduction with hydrogen. Optionally, a halogen, such as fluorine, is incorporated before, during, or after addition of palladium. The fluorine is added in a form of a reactive fluorine compound, such as hydrogen fluoride or trifluoroacetic acid. As previously mentioned, the catalysts which are thus prepared are more active than conventional catalysts for promoting the isomerization of $C_4$–$C_6$ normal hydrocarbons, and are stable against degradation by contact with sulfur contaminants in the hydrocarbon feedstock.

The utility of this invention in increasing the surface-area index of a commercial silica-alumina cracking catalyst, and in increasing the resistance to sulfur aging of an isomerization catalyst comprising palladium supported on silica-alumina, has been demonstrated experimentally. First, the irreversible water content of a cracking catalyst was determined as above-described. This catalyst was a silica-alumina hydrogel which had been spray-dried at an average bulk temperature of about 800° F. The irreversible water content was found to be 3.46 g. or 0.192 mol per 100 g. of catalyst. This, of course, is equivalent to 0.384 mol of hydroxyl groups available for reaction in the catalyst. The catalyst contained 75% wt. silica and 25% wt. alumina, had been initially calcined at about 800° F., and just prior to use had been dried at about 400° F. Portions of the catalyst were then treated further in accordance with this invention, as described in the following examples.

Example I

A 1.8-g. portion of elemental sulfur was mixed thoroughly with 250 g. of commercial 75/25 silica-alumina cracking catalyst which had been dried at 400° F. for 3 hours. The mixture was heated at 975° F. for 4 hours, until reaction was complete. Before addition of sulfur, the silica-alumina catalyst had a surface-area index of 280 m.²/g. The chemical incorporation of sulfur in accordance with this invention increases substantially the surface-area index. The surface-area indexes of the supports are determined by the Aromatic Adsorption Index Technique (described in API Proceedings, vol. 27 (III), 1947, pp. 38–46), which gives a dimensionless relative surface measurement which is convertible to a surface-area index expressed in square meters per gram.

Half of the sulfur-treated catalyst support was next impregnated with 121 ml. of an aqueous solution containing 2.1 g. of palladium nitrate and 5.1 g. of 50% aqueous hydrofluoric acid. The impregnated support was dried at 230° F. for 65 hours, mixed with 1% wt. of graphite, and formed into ⅛-inch pellets. The catalyst pellets were activated by reduction with hydrogen at 750°–975° F. The resulting catalyst consisted of 75/25 silica-alumina containing 0.65% wt. palladium, combined sulfur, and 2% wt. combined fluorine.

For purposes of comparison, a portion of the palladium-containing catalyst prepared above was tested in the isomerization of technical grade n-pentane, and the results were compared with the results obtained using catalysts of similar composition which were not treated with sulfur in accordance with this invention. A mixture of hydrogen and a hydrocarbon feed, consisting of about 97% vol. n-pentane, 2% vol. cyclopentane, and 1% vol. hexane, was passed over the catalyst at 755° F., 520 p.s.i.g., hydrogen/hydrocarbon feed mol ratio of 1.3, and liquid weight hourly space velocity (LWHSV) of 25. The feed was first passed through a guardcase to remove any sulfur present in the feedstock to avoid contamination of the catalyst during initial evaluation of catalytic activity. The activity of the catalyst was determined in terms of a reaction-rate constant, K. The rate constant K is a pseudo first-order reaction-rate constant and is expressed by the formula $$K = (LWHSV) \ln \left[ \frac{1}{1 - \frac{x}{62}} \right]$$

where LWHSV is the liquid weight hourly space velocity and $x$ is the percent isopentane yield. In this experiment, the catalyst was found to have a rate constant K of 24.9, at the above-described reaction conditions.

After determination of the initial activity of the isomerization catalyst, a portion of the catalyst was subjected to treatment with hydrogen sulfide to determine its stability against degration by contact with sulfur compounds. In this test, the catalyst was (1) dried at 975° F. by contact with flowing hydrogen until the water content of the effluent hydrogen diminished to less than 200 p.p.m., (2) contacted at 750° F. for 125 minutes with a gaseous mixture consisting of 10 parts of hydrogen sulfide and 3 parts of hydrogen, (3) purged for 10 hours at 750° F. with flowing hydrogen, and (4) cooled under a slow flow of hydrogen. After being subjected to this treatment, the catalyst was again evaluated in the isomerization of technical grade n-pentane under the same conditions used for determination of the initial activity of the catalyst. The catalyst in this test was found to have a reaction-rate constant K of 25.6. This experiment indicates that the catalyst was of very high initial activity and very resistant to sulfur aging. When a catalyst of the same composition (0.65% wt. palladium, 2% wt. fluorine, on 75/25 silica-alumina), which had been prepared from a non-sulfur-treated silica-alumina, was evaluated under the above-described isomerization conditions, it was found to have a reaction-rate constant K of 15.7. This catalyst was then subjected to treatment with hydrogen sulfide as described above and the reaction-rate constant K decreased to a value of 13.5. From these experiments, it is seen that a catalyst which has been prepared from an unmodified support has a lower initial isomerization activity, and is sensitive to deactivation by sulfur compounds.

In another experiment, the unmodified catalyst described above was used in a 145-hour isomerization run using technical grade n-pentane feeds to which had been added dimethyl sulfide and thiophene equivalent to 5 p.p.m. sulfur, under isomerization conditions of 755° F., 580 p.s.i.g., and hydrogen/hydrocarbon feed mol ratio of 2.5, and LWHSV of 8. In this run, the feeds were not passed through a guard-case and the catalyst was found to decline in activity at a rate of 5.8% yield units per 100 hours on stream. This run correlates with the data indicated by the hydrogen-sulfide treatment in showing that the unmodified catalyst is extremely sensitive to the presence of sulfur in a hydrocarbon feed. The catalyst in which the support has been treated with sulfur as described above has an aging rate of substantially zero under the same isomerization conditions.

*Example II*

A 26.9-g. portion of commercial 75/25 silica-alumina cracking catalyst, as used in Example I, in pellet form, was dried at 975° F. for 2.7 hours under a hydrogen flow at a rate of 5 cu. ft./hr. The dried silica-alumina was contacted for 4 hours at 975° F. with a gaseous mixture consisting of about 10 parts of hydrogen sulfide and 3 parts of hydrogen at a total flow rate of 0.13 cu. ft./hr. The treated silica-alumina was then flushed for 20 hours at 975° F. with hydrogen flowing at 5 cu. ft./hr. and was cooled in a small flow of hydrogen through the catalyst bed. Before addition of sulfur, the silica-alumina catalyst had a surface-area index of 280 m.$^2$/g. The chemical incorporation of sulfur in accordance with this invention produces a substantial increase in surface-area index.

The treated silica-alumina was next pulverized to a fine powder, impregnated with 24 ml. of an aqueous solution containing 0.44 g. of palladium nitrate and 1.1 g. of 50% aqueous hydrofluoric acid, and dried over-night at 230° F. Then 1% wt. of graphite was added to the catalyst powder, and the mixture was formed into ⅛-inch pellets and activated by reduction with hydrogen at 750°–975° F. When this catalyst is used in the isomerization of technical grade n-pentane at 755° F., 520 p.s.i.g., hydrogen/hydrocarbon feed mol ratio of about 1.3, and LWHSV of 25, the catalyst has a rate constant of about 21. This catalyst was subjected to a hydrogen sulfide treatment of the type described in Example I (which resulted in the deactivation of an unmodified catalyst) and found to have a rate constant K of 21.4 at the above-described isomerization reaction conditions. This catalyst also has a substantially zero aging rate when used in extended runs in an isomerization process using a technical grade of n-pentane, containing 5 p.p.m. sulfur, as feedstock.

When the silica-alumina catalyst support is treated with any of the various sulfur compounds previously described, e.g., sulfur halides, carbon disulfide, carbonyl sulfide, etc., there is an increase in the surface-area index of the catalyst material. When silica-alumina supports which have been treated with the sulfur compounds, or with elemental sulfur, are used in the preparation of palladium-containing catalysts (containing 0.3–0.8% wt. palladium), catalysts are obtained which have a very high initial activity and which are resistant to poisoning by sulfur compounds contained in the hydrocarbon feed to an isomerization process. In the preparation of the palladium-containing catalyst, the hydrogen fluoride may be eliminated completely, in which case a catalyst is obtained having somewhat lower initial activity, but which is highly resistant to sulfur poisoning. Other fluorine compounds may be substituted for hydrogen fluoride in the catalyst preparation, e.g., trifluoroacetic acid, ammonium fluoride, or certain fluorinated hydrocarbons. This process is applicable generally to the preparation of isomerization catalysts consisting of about 0.3–0.8% wt. palladium on an acidic silica-alumina (preferably 70–90% wt. silica). The elemental sulfur or sulfur compound is reacted with the silica-alumina in an amount to give a sulfur concentration of about 0.05–3.0% wt. of the silica-alumina, or about 1–100% of the stoichiometric amount of the sulfur or sulfur compound required to react with the surface hydroxyl groups or reactive surface sites in the silica-alumina.

In the isomerization of a hydrocarbon feed using the improved catalysts of this invention, it has been found that the catalysts are highly active in the isomerization of n-pentane and n-hexane, or mixtures thereof. The isomerization process may be carried out using the improved catalysts of this invention at a reaction temperature of 700°–790° F., sufficient to effect isomerization, a pressure of 100–1000 p.s.i.g., and a hydrogen/hydrocarbon feed mol ratio of about 0.5–5.0. The hydrocarbon feed may contain from zero to 10 p.p.m. of sulfur without requiring the use of a guard-case in the process. Thus, the improved catalysts of this invention are resistant to degradation on extended use with hydrocarbon feeds containing from zero to 10 p.p.m. sulfur. Catalysts in which the support has received no preliminary treatment are rapidly poisoned by hydrocarbon feeds containing as little as 1 p.p.m. sulfur.

While we have described our invention fully and completely with special emphasis upon several preferred embodiments of the invention, we wish it to be understood that within the scope of the appended claims, this invention may be practiced otherwise than as specifically described.

The embodiments of the invention in which an exclusive property or privilege is claimed are defined as follows:

1. A method of preparing an isomerization catalyst resistant to sulfur aging which comprises reacting a silica-alumina support which has been predried at elevated temperature under conditions to leave structural hydroxyl groups in the silica-alumina and which contains 70–90% silica, with 1–100% of the stoichiometric amount of a substance, selected from the group consisting of sulfur and compounds containing sulfur reactable with the hydroxyl groups in the silica-alumina, required to react with the hydroxyl groups in the silica-alumina, at a temperature of 400°–1000° F. until reaction with the hydroxyl groups is complete, as evidenced by cessation of evolution of byproduct vapors, subsequently impregnating the treated support with a solution of a palladium compound to a palladium content of 0.4–0.8% wt., and activating the catalyst by reduction with hydrogen at 750°–975° F.

2. A method in accordance with claim 1 in which the reactant substance is sulfur.

3. A method in accordance with claim 1 in which the reactant substance is carbon disulfide.

4. A method in accordance with claim 1 in which the reactant substance is a sulfur halide.

5. A method in accordance with claim 1 in which the reactant substance is hydrogen sulfide.

6. A method in accordance with claim 1 in which the reactant substance is a thionyl chloride.

7. A method in accordance with claim 1 in which the sulfur-treated catalyst support is combined with 1–5% wt. fluorine in the form of a reactive fluorine compound.

8. A method in accordance with claim 1 in which 75/25 silica-alumina is reacted with sulfur at about 975° F.

9. A method in accordance with claim 1 in which 75/25 silica-alumina is reacted with hydrogen sulfide at about 975° F.

10. An isomerization catalyst prepared in accordance with claim 1, characterized by resistance to sulfur aging.

References Cited in the file of this patent

UNITED STATES PATENTS

| | | |
|---|---|---|
| 2,550,531 | Ciapetta | Apr. 24, 1951 |
| 2,606,878 | Haensel | Aug. 12, 1952 |
| 2,743,215 | Riblett et al. | Apr. 24, 1956 |
| 2,766,302 | Elkins | Oct. 9, 1956 |
| 2,914,464 | Burton et al. | Nov. 24, 1959 |
| 2,925,453 | Folkins et al. | Feb. 16, 1960 |
| 2,937,214 | Folkins et al. | May 17, 1960 |
| 3,006,841 | Haensel | Oct. 31, 1961 |